US011126572B2

(12) United States Patent
Nagabhushana et al.

(10) Patent No.: US 11,126,572 B2
(45) Date of Patent: Sep. 21, 2021

(54) METHODS AND SYSTEMS FOR STREAMING DATA PACKETS ON PERIPHERAL COMPONENT INTERCONNECT (PCI) AND ON-CHIP BUS INTERCONNECTS

(71) Applicant: Intel Corporation, Santa Clara, CA (US)

(72) Inventors: Rashmi Nagabhushana, Bangalore (IN); Raj Kumar Jain, Bangalore (IN); Naveed Alam, Bangalore (IN)

(73) Assignee: INTEL Corporation, Santa Clara, CA (US)

( * ) Notice: Subject to any disclaimer, the term of this patent is extended or adjusted under 35 U.S.C. 154(b) by 708 days.

(21) Appl. No.: 15/895,350

(22) Filed: Feb. 13, 2018

(65) Prior Publication Data

US 2019/0042489 A1   Feb. 7, 2019

(51) Int. Cl.
| G06F 13/16 | (2006.01) |
| G06F 3/06 | (2006.01) |
| H04L 12/879 | (2013.01) |
| H04L 12/861 | (2013.01) |
| G06F 13/28 | (2006.01) |

(52) U.S. Cl.
CPC ........ *G06F 13/1668* (2013.01); *G06F 3/0613* (2013.01); *G06F 3/0656* (2013.01); *G06F 3/0659* (2013.01); *G06F 3/0679* (2013.01); *H04L 49/901* (2013.01); *H04L 49/9057* (2013.01); *G06F 13/28* (2013.01); *G06F 2213/0026* (2013.01); *G06F 2213/0038* (2013.01); *G06F 2213/2804* (2013.01)

(58) Field of Classification Search
CPC .......... G06F 11/07; G06F 12/00; G06F 13/40; G06F 13/4022
See application file for complete search history.

(56) References Cited

FOREIGN PATENT DOCUMENTS

| EP | 2413551 A1 | 2/2012 |
| WO | 2009/034221 A1 | 3/2009 |

*Primary Examiner* — Getente A Yimer
(74) *Attorney, Agent, or Firm* — 2SPL Patent Attorneys PartG mbB; Yong Beom Hwang

(57) ABSTRACT

A method and architecture to write data between a source and destination by memory mapped writes or streaming packets between any of a host, a peripheral or a sub-peripheral device. A stream address is used to write the data to a memory of the destination without the source being aware of physical addresses of destination memory, i.e., memory descriptors or pointers are not used, allowing the destination to manage its own memory. The stream address may enable streaming data packets over interconnects that may not allow packet streaming by dividing a data packet into data chunks and including a stream address for each chunk. The stream address for a given packet includes a repeated first portion indicating the destination and a varied second portion indicating variable information for each data chunk such as start of packet (SoP) and end of packet (EoP) identifiers.

20 Claims, 7 Drawing Sheets

METHODS AND SYSTEMS FOR STREAMING DATA PACKETS ON PERIPHERAL COMPONENT INTERCONNECT (PCI) AND ON-CHIP BUS INTERCONNECTS

FIELD

Embodiments of the present invention relate generally to, but not limited to, communication architectures and methods for transferring data on components and system interconnects.

BACKGROUND

Peripheral component interconnects (PCI) and PCI express (PCIe) are interconnect architectures for communicating data, such as Ethernet packets, between various components or chip interconnects on various computer and communication systems. On-chip interconnects, such as advanced eXtensible interconnect (AXI) or open core protocol (OCP) are used for interfacing different components in a system on a chip (SoC). These interconnect architectures are generally memory mapped interfaces (MMIs). There is a desire to increase the efficiency of these type of interfaces to increase speed or bandwidth of data exchanges and/or reduce power consumption or memory utilization of devices, among other benefits.

BRIEF DESCRIPTION OF THE DRAWING FIGURES

Certain circuits, logic operation, apparatuses and/or methods will be described by way of non-limiting example only, in reference to the appended Drawing Figures in which.

DETAILED DESCRIPTION OF THE INVENTION

While reference to example embodiments of the invention may be made to certain existing interconnect systems and architectures, the inventive embodiments are not so limited and may be applied to any suitable interconnection architecture(s) where similar advantages and improved features may be applied. Thus the specific description herein is provided only in context of example implementations and the appended claims are in no way limited to any particular example referenced.

Figure 1:
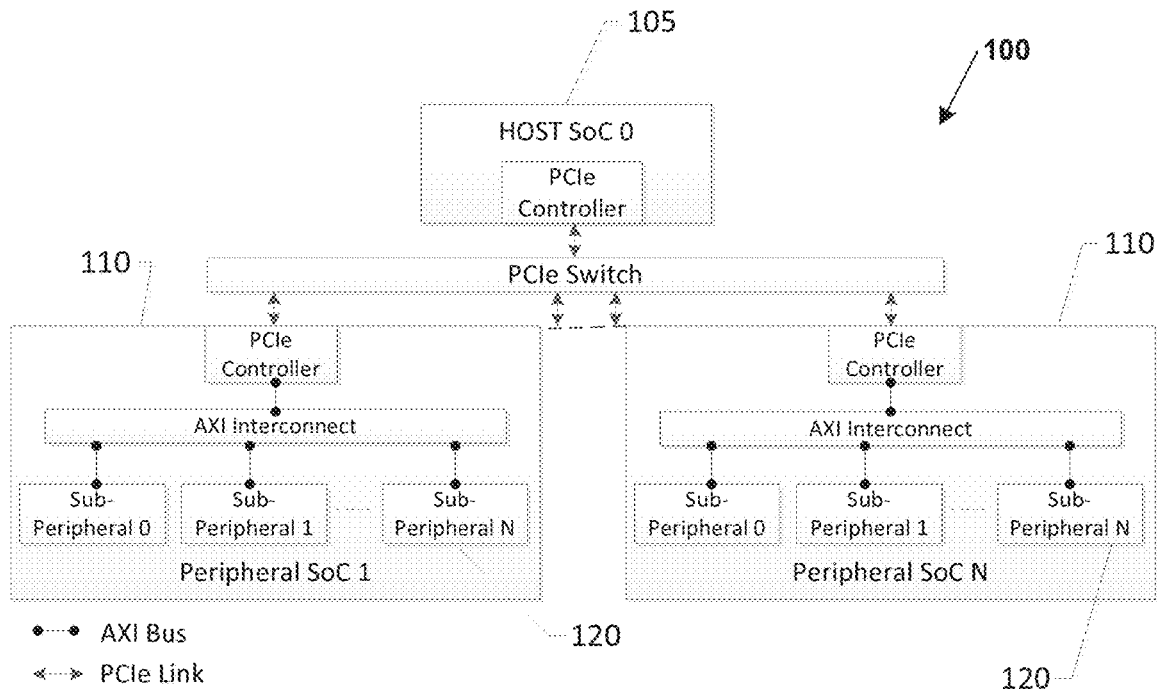
FIG. 1 shows a generic block diagram of a basic interconnect system to certain example embodiments of the present invention may be applied.
Figure 2:
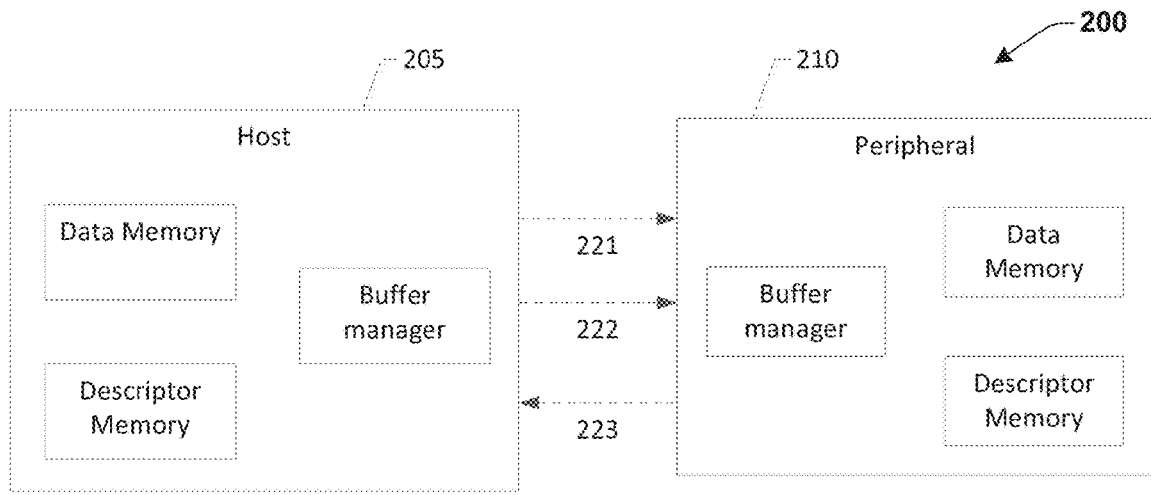
FIG. 2 shows a generic block diagram of host to peripheral data write according to a conventional technique shown by dashed arrows.

A basic interface architecture 100 is shown in FIG. 1, in which data is exchanged between host 105 and peripherals/sub-peripherals 110, 115, 120, etc. such as Network Processors, Switches/Routers, Link Layer and/or PHY layer devices. Generically, packets are exchanged between host and peripherals, between different peripherals and also, potentially, with several sub-peripherals 120 in an SoC. As mentioned above, xMII interfaces such as GMII, XGMII, RGMII, SMII, etc.) are well suited for these kind of packet transfers. PCIe is very widely used as an inter-device connection in systems and AXI/OCP are very widely used as on-chip interfaces in SoCs. It is important for PCIe and on-chip bus interfaces to support streaming of packet data efficiently, with minimal overhead.

An example functional block diagram 200 of communication from a host 205 to a peripheral 210 is shown where dashed lines represent read write operations in current solutions. Typically, when a host 205 has to send data to a peripheral 210, it either writes 221 descriptors or address pointers of the packets stored in its memory into the peripheral, or sends 221 a message to the peripheral 210 indicating the number of packets stored in its memory. Peripheral 210 reads these descriptors or pointers from host 205 and reads 222 the packet data from the source's memory and writes 223 the pointers to host 205 indicating that the pointers are free to be reused or the peripheral could also write the number of pointers being freed.

Figure 3:
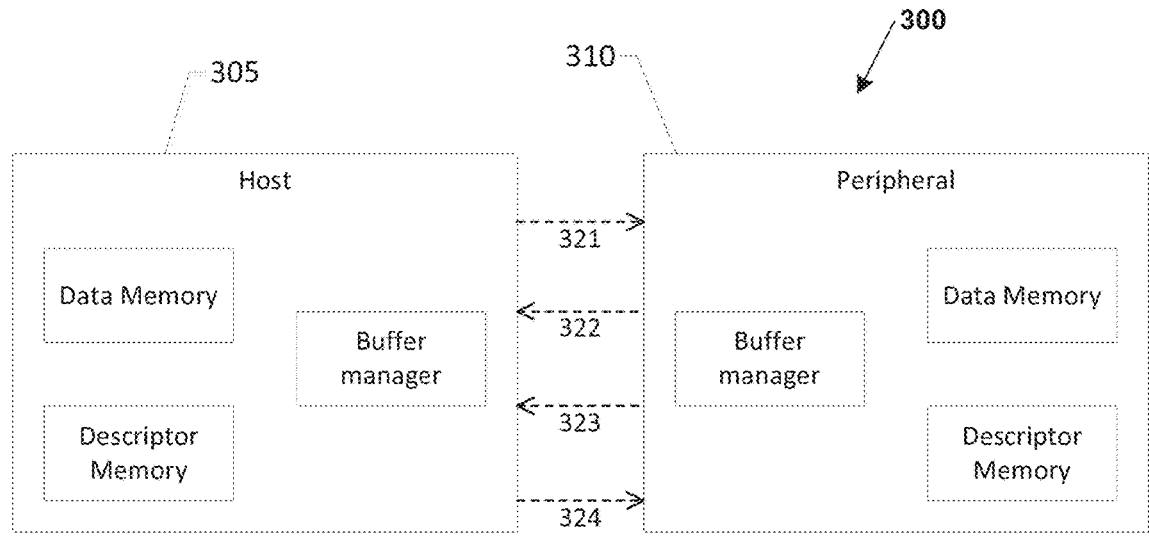
FIG. 3 shows a generic block diagram of a peripheral to host data write according to a conventional technique shown by dashed lines.

In reference to FIG. 3, an example process block diagram 300 for peripheral 310 to send data to host 305 is shown. In the conventional process, as shown by dashed lines, the host 305 may write 321 a set of pointers to the peripheral during initialization. Peripheral 310 writes 322 packet data in the host memory at these pointers and also writes 323 the used pointers (or descriptors) to host 305. After the packets are processed, host 305 writes 324 the pointers to the peripheral 310 indicating that the pointers are free to be reused or the peripheral writes the number of pointers being freed.

These conventional types of data exchange processes require additional data exchanges of descriptors over the interconnect, specialized logic for managing these descriptors, and additional memory for storing the logic and descriptors.

PCIe supports packet streaming over AXI-4 stream type interconnects, but AXI-4 has the following disadvantages: (1) In AXI-4 streaming, memory mapped accesses are not possible but memory mapped accesses are required for the host 105 to configure the peripherals 110, 115 (FIG. 1); (2) the max burst size on PCIe needs to be as large as the max packet size but it is desirable to have small burst sizes, as PCIe is a shared interface, a large burst size would deteriorate quality of service (QoS) for different peripherals; and/or (4) AXI-4 streaming requires large buffering within the PCIe controllers.

In embodiments of the present invention, memory mapped packet writes from source to destination (e.g., a host, peripheral or sub-peripheral exchanged upstream or downstream) may be performed without the source being aware of the memory management at the destination using an addressing scheme, referred to herein as a "stream address" "streaming address" or "stream addressing," In various embodiments of stream addressing disclosed herein, stream addresses map into the address map of each peripheral/sub-peripheral and host and are defined in the interconnect system for packet data exchange. As described in more detail in the embodiments below, generally, the source may perform a memory mapped write of subdivided chunks of data, such as PCIe/AXI data, of a larger packet of data to be transferred to a particular destination using a stream address having a same address portion and variable chunk identifier portion. The chunk identifier portion may be varied for each data chunk by including basic information of each data chunk of the data packet transfer, such as Start of Packet (SoP), Middle of Packet (MoP), End of Packet (EoP) bits and other information such as Stream ID (e.g., bearer channel in DSL, VAP/Station-ID/Access-Category in WLAN, or Port-ID in Network Processors, etc.) and any other meta-data desirable are embedded in the stream address. To generate backpressure, for example when a destination memory is full, the destination may perform memory mapped writes to a backpressure register located in the source to cause the source to cease further transmission of data, at least temporarily.

Using the various techniques of the preferred embodiments, packet data may be streamed over memory mapped PCIe and/or On-chip interconnects and memory mapped accesses and packet streaming may be performed over the various interconnects between the source and destination using a stream address of the inventive embodiments. With the address streaming interconnects, the source does not need to know how the destination memory is managed and vice versa, as the source and destination manage their own memories without the others knowledge and therefor without exchanging information to have such knowledge.

According to various embodiments, there is no need for descriptor data or memory pointers to be exchanged between the source and destination over interconnects and the associated logic for descriptor management may be omitted. Since a minimum descriptor size is typically 2 32-bit words per packet, up to 12% bandwidth on the interconnect may be freed for small packet (i.e., 64 bytes) transfers, by virtue of eliminating the descriptor exchanges using embodiments of the present invention.

Moreover, utilizing the inventive embodiments for address streaming, a significant amount of memory on a peripheral device is saved/freed, as descriptors are no longer need to be stored on-chip. For example, a G.fast or WiFi peripheral, supporting 2 Gbps data rate and 8 traffic classes, may require anywhere from 1.5 to 4 Mb of memory for storing descriptors in the peripheral device, which may be freed for other use or reduce a device's memory capacity requirements using stream addressing of various embodiments disclosed herein.

An additional advantage of the inventive embodiments is since packet data streaming is done at a PCIe/AXI chunk level, a better QoS across multiple streams can be achieved. Transparent to the entire interconnect, PCIe switches and AXI interconnects do routing based on the destination address range.

According to various embodiments of the present invention, packets may be streamed over memory mapped (or address mapped) PCIe and on-chip bus interfaces such that memory mapped accesses and packet streaming may co-exist over same PCIe link and on-chip bus. In various embodiments, the PCIe or on-chip bus address differentiates between memory mapped access and stream access. For example, each peripheral's (or sub-peripheral's) address range may be divided into physical address and stream address ranges. Memory mapped accesses fall in the physical address range and stream transfers fall in the stream address range. The destination device memory controller (e.g., the receiving DMAs and AXI slaves at a host or peripherals/sub-peripheral) decodes memory mapped or stream access based on these ranges.

In the following example embodiments, AXI is shown as an on-chip bus. However, the inventive embodiments are applicable for any burst (or chunk) transfer-based on-chip busses.

Figure 4:
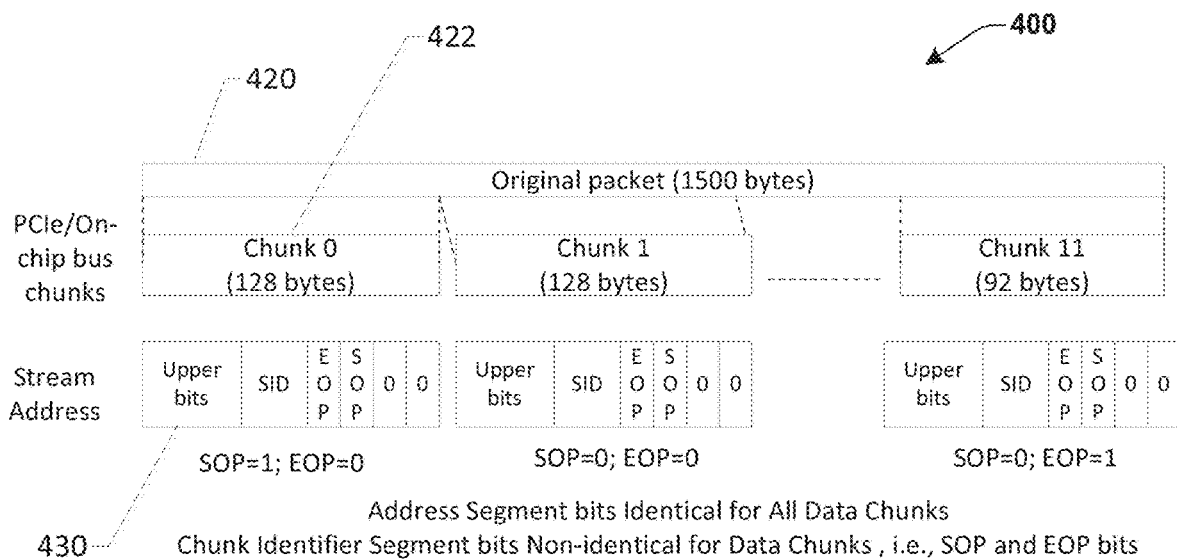
FIG. 4 shows and example embodiment for stream addressing a data packet using a stream address according to various aspects of the invention.

Example Embodiments of Addressing Mapping:

Referring to FIG. 4, an example embodiment of stream addressing 400 will now be described. In a stream addressing format 400 according to one embodiment, a data packet 402, for example, a 1500 byte packet, such as an Ethernet packet, needs to be written from a source to a destination. Packet 402 is divided into a plurality of data chunks 422 (e.g., 128 byte chunks) of PCIe, AXI or other data interconnect chunks, and each chunk assigned a stream address 430. An address portion of the stream address for each data chunk 422 is the same for the parsed packet 402 with the exception of handling information like Start of Packet (SoP), Middle of Packet (MoP), End of Packet (EoP) bits and any other information (such as Stream ID, if a sub-peripheral supports multiple streams) is embedded in the stream address for each chunk 422, because SoP, MoP and EoP will necessarily differ for each stream address, except in a case where the data to be written may fit entirely in on data chunk, i.e., SoP and EoP both=1. This non-repetitive portion of the stream address is referred to as a data chunk identifier segment of the stream address.

Figure 5:
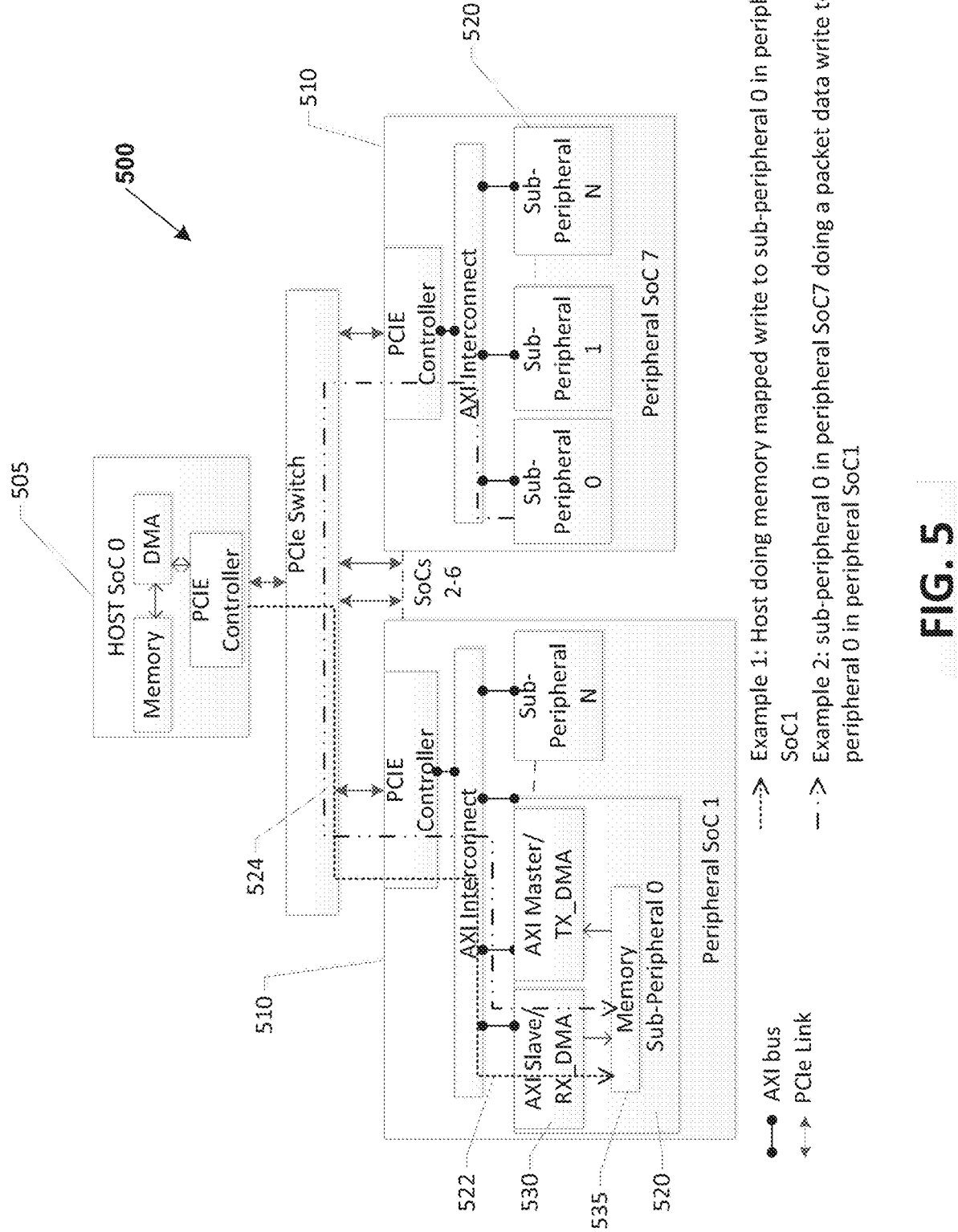
FIG. 5 shows an example functional block diagram of a system and stream addressing interconnect operations according to certain embodiments of the invention.

Turning to FIG. 5, an example system 500 adapted for stream addressing data over interconnects might include 8 SoCs, including 7 peripherals 510 (SoCs 1-7) and 1 host 505 (SoC0), although this configuration is merely an example and in no way limiting to application of the inventive embodiments. In this example, each peripheral 510 may further include a plurality of sub-peripherals 520 (e.g., sub-peripherals 0-N). Each sub-peripheral 520 may include a receive (RX) and transmit (TX) AXI slave/direct memory access (DMA) module 530 for writing to or from its memory 535. Host 505 might have, for example, 1 GB of internal memory, or it could be an external memory such as a dynamic random access memory (DRAM), and each sub-peripheral may have, for example, 1 MB of address space in its memory 535, of which the first 1023 KBs may be physical address space and the last 1 KB is stream address space for packet streaming. The RX DMA at the AXI slave 530 at the sub-peripheral decodes if the AXI write access falls in the physical or stream address range. If it falls in the stream address range, it is considered a packet data transfer.

Example 1

Host 505 doing a memory mapped write 522 (shown by dotted arrow line in FIG. 5) to memory 535 in sub-peripheral0 520 of peripheral SoC1 510, may address the write 522 using a physical address as shown in Table 1 below:

TABLE 1

Example of Physical Address Format (for 32-bit address)

| | Address bits | | | |
|---|---|---|---|---|
| | 31:25 | 24:22 | 21:20 | 19:0 |
| Value | 'b1100000 | Peripheral (0) | Sub-Peripheral (0) | Address |

Example 2

Sub-peripheral0 in peripheral SoC7 510 doing packet write 524 (shown by dashed arrow line in FIG. 5) to memory 535 in sub-peripheral0 on peripheral SoC1 510. In a data packet transfer, the stream address used may have a format as shown in Table 2 below:

TABLE 2

Example of Stream Address Format for Packet Streaming

| | | | | Address bits | | | | | |
|---|---|---|---|---|---|---|---|---|---|
| | 31:25 | 24:22 | 21:20 | 19:10 | 9:4 | 3 | 2 | 1 | 0 |
| Value | 'b1100000 | Peripheral | Sub-Peripheral | All 1s | Stream ID | EOP | SOP | 0 | 0 |

As mentioned previously, all chunks of the packet write 524 will have the same general address information, referred to herein as an "address segment" of a stream address. SoP, MoP and/or EoP information (or potentially other fields that may need differentiating to correctly store or recover the chunks of a data packet being streamed) are referred to herein as a "chunk identifier segment" of the address for packet streaming.

In one example, a data packet to be streamed from a source to a destination has a size of 1500 bytes. When the data packet to be streamed must comply with, for example, both a max AXI interconnect data chunk size and a PCIe maxPacketSize, due to the source and destination device being connected over a combination of both PCIe and AXI types of interconnects, as illustrated in FIGS. 1, 3 and 5-7, an AXI data chunk transfer might, for example, allow a data chunk having a maximum size of 128 bytes to be transferred over the AXI interconnect. Thus a 1500 byte data packet may be written/streamed to/from a device, interfaced using such an AXI interconnect, in 12 separate data chunks divided from the original 1500 byte data packet to be streamed over the AXI interconnect. In this case, the 1500 byte data packet may be parsed into 11 data chunks of 128 bytes in size, and a last data chunk of the original 1500 data packet being streamed, would be 92 bytes in size.

As shown in Table 3 below, an example format of stream address for a first chunk of 128 bytes would use a chunk indicator or chunk identifier portion for the assigned stream address which may differ for each data chunk, to assist in reconstructing/using data of the original 1500 byte data packet. An example chunk identifier portion of an assigned stream address according to various embodiments for the first 128 byte data chunk, i.e., where SoP=1 and EoP=0, identifies it as the beginning chunk of data in the streamed 1500 byte data packet and may use the format shown in Table 3 as follows:

TABLE 3

Address Streaming of Packets

| 31:25 | 24:22 | 21:20 | 19:10 | 9:2 | 1 | 0 |
|---|---|---|---|---|---|---|
| 'b1100000 | 010 | 00 | All 1s | 00000000 | 0 | 1 |

The subsequent ten 128-byte data chunks may be written using the stream address, where SoP=0 and EoP=0, as shown in Table 4:

TABLE 4

| 31:25 | 24:22 | 21:20 | 19:10 | 9:2 | 1 | 0 |
|---|---|---|---|---|---|---|
| 'b1100000 | 010 | 00 | All 1s | 00000000 | 0 | 0 |

The twelfth and last data chunk of the packet transfer of 92 bytes may be written with a stream address, where SoP=0 and EoP=1, as illustrated in Table 5:

TABLE 5

| 31:25 | 24:22 | 21:20 | 19:10 | 9:2 | 1 | 0 |
|---|---|---|---|---|---|---|
| 'b1100000 | 010 | 00 | All 1s | 00000000 | 1 | 0 |

In another example, the packet memory in the destination could be managed as a linked list of small segments and the size of the memory segment could be different from the AXI or PCIe chunk size. So, at any point of time, it will not be known to the source which segment is free and which is occupied to do a memory mapped write. Accordingly, even for small packets (or all packets in general), stream address shall be used. A sample stream address of such a potential smaller packet, which will fit entirely in one chunk, is shown in Table 6. Here, SoP=1 and EoP=1 in the chunk identifier segment, which indicates a single chunk is to be written and the destination device manages where is the data is written in memory such as an on chip memory or external memory such as a DRAM as discussed previously.

TABLE 6

| 31:25 | 24:22 | 21:20 | 19:10 | 9:2 | 1 | 0 |
|---|---|---|---|---|---|---|
| 'b1100000 | 010 | 00 | All 1s | 00000000 | 1 | 1 |

It is important to note that a middle of packet (MoP) or other sequential type of indicator may be used in the chunk identifier segment of the stream address for the data chunks between the chunks representing the SoP and EoP as well, if the specific order of data present in the original data packet being streamed is considered important to identify or distinguish from other data chunks in between the start and end of a data packet. Accordingly, the specific fields in the chunk identifier portion of the stream address in the various embodiments may be selected as suitably desired without departing from the scope of the inventive embodiments disclosed herein.

Figure 6:
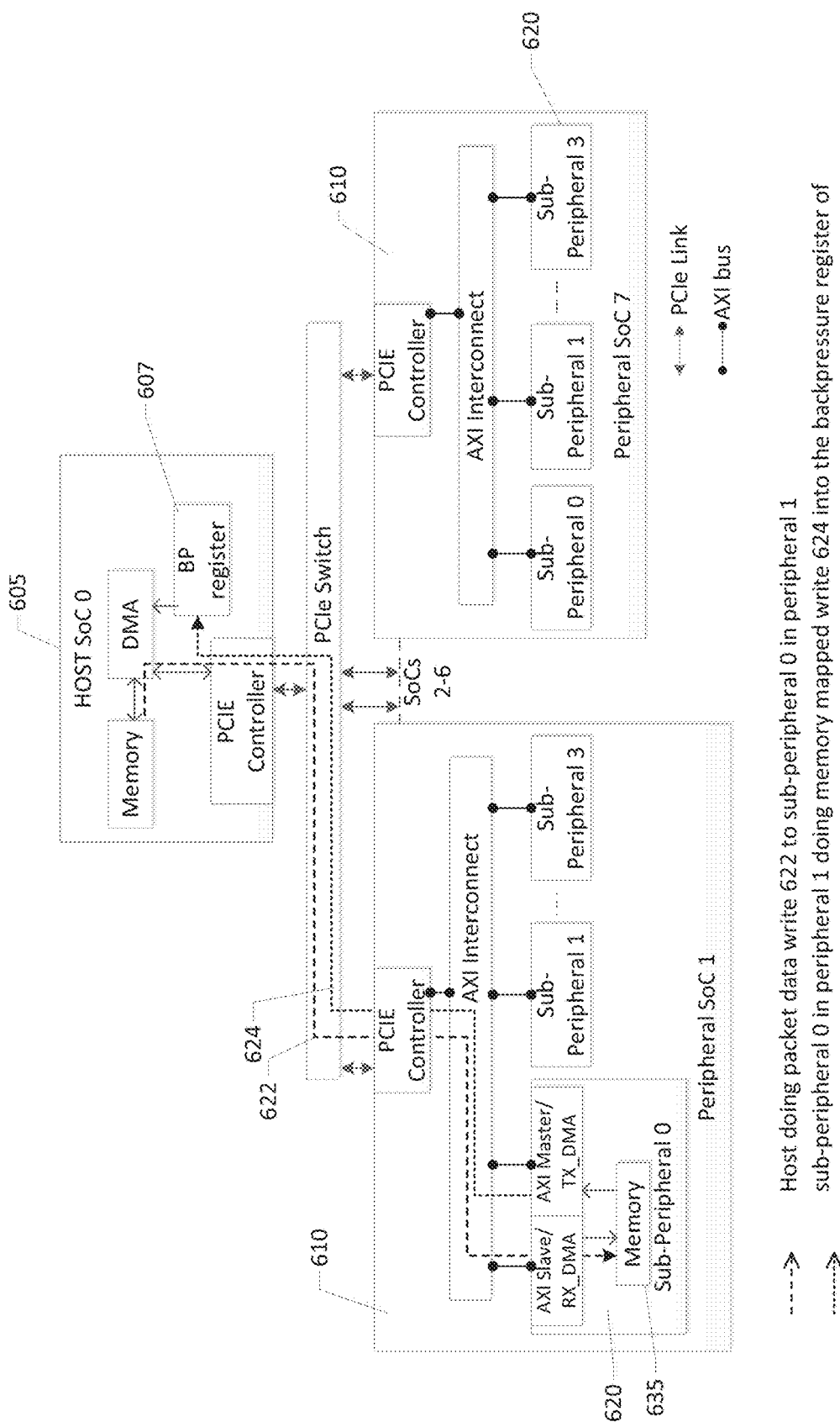
FIG. 6 shows an example functional block diagram of a system with stream addressing interconnect and data write operations with a back pressure register according to aspects of the invention.

Referring to FIG. 6, an example functional block diagram of a stream addressing interconnected system 600 with back pressure overflow protection according various embodiments is shown and described. As an example, host 605 may be doing a packet data write 622 to memory 635 of sub-peripheral 0 (620) in peripheral SoC1 (610). Since the destination, i.e., sub-peripheral0, manages its own memory 635, without awareness by the source, e.g., host 605, a mechanism to address potential overburdening a device's buffer/memory or avoiding data loss, may be desirable in certain embodiments. When the destination's internal memory, e.g. memory 635, gets full, or within a specified threshold of being full, e.g., nearly full, the destination device may set 624 a backpressure bit in a backpressure register located at the source, in this example, register 607 in host 605. When the backpressure flag is set in register 607, the memory controller or direct memory access (DMA) at source 605 will stop packet writes to sub-peripheral0's memory 635 until the backpressure flag is cleared by the destination, a predetermined amount of time or other user desired condition occurs, and the packet write 622 may be continued by source 605.

In one embodiment, indication of backpressure by the destination to the source is made very simple by the destination using a memory mapped write to the source for setting a backpressure flag at the source. In preferred embodiments, each source (e.g., a host, peripheral or sub-peripheral) should preferably implement a backpressure register for each destination to which it may write data, particularly those they may stream data packets to. These register bits serve as a gate in transfers from the source to the corresponding destination (or any stream within the destination). The destination just sets the register flag using a memory mapped write 624 to the source setting bits in its back pressure register, when needed, to pause the stream transfer from the source. In an alternative embodiment, a peripheral could also aggregate all the backpressure indication signals from all the sub-peripherals within it and configure a multi-bit register in the source at periodic intervals. Other implementations of the back pressure register and their specific configurations may be varied based on a system architects desired functionality, components and features without departing from the scope of the inventive embodiments.

Figure 7:
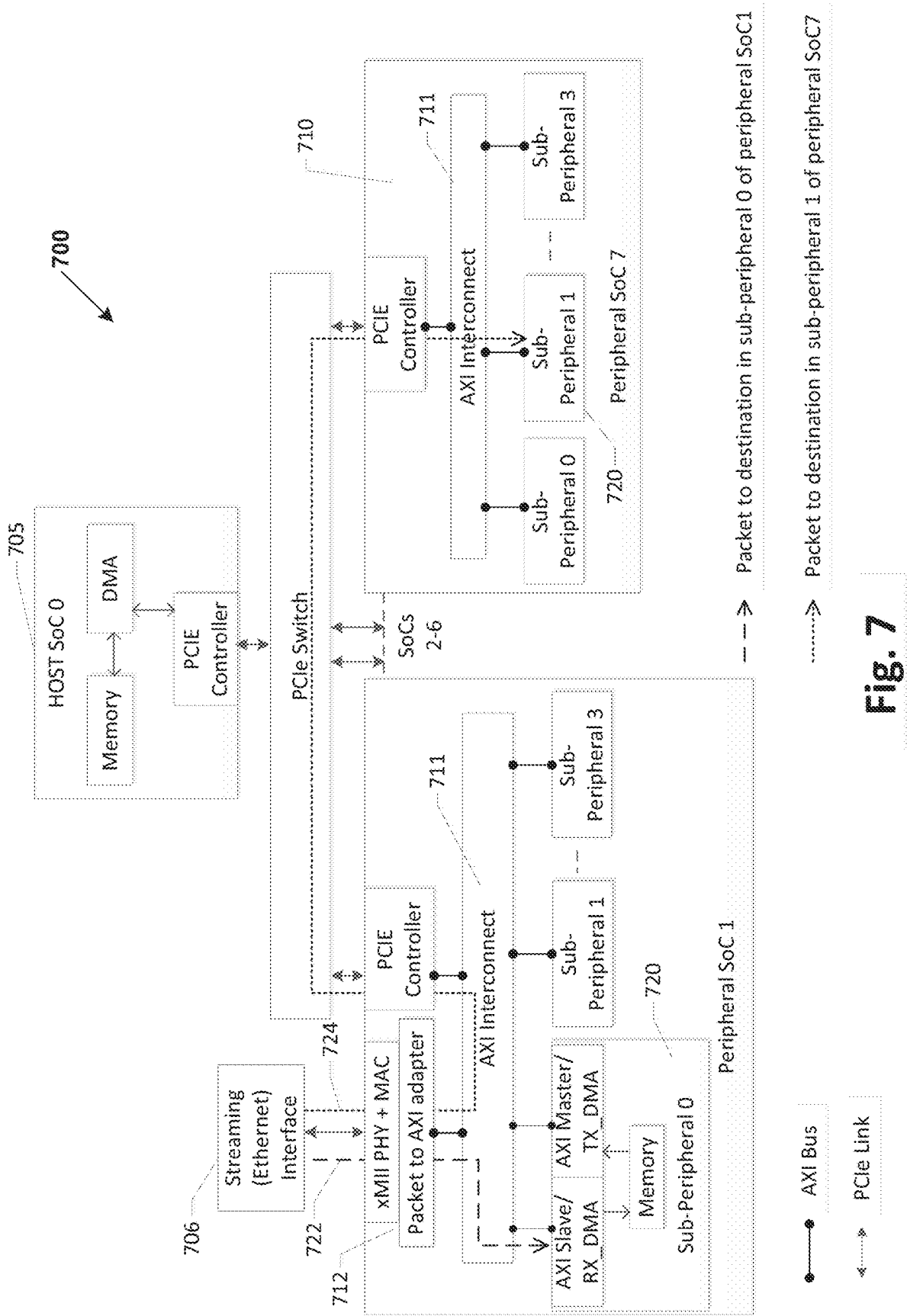
FIG. 7 shows an example functional block diagram of a system with streaming data interface and address streaming operations according to various aspects of the inventive embodiments.

Referring to FIG. 7, a system 700 to handle extension for non-memory mapped (xMII) interfaces according to various embodiments is shown. In this example, peripheral SoC1 (710) has a streaming interface 706, such as an Ethernet interface. The stream addressing embodiments disclosed herein, may also be used in system 700, where packets between streaming interface 706 can be written to and from sub-peripherals 720, both on the peripheral SoC1 and other peripheral SoCs and their respective sub-peripherals 720, via PCIe interconnects and AXI interconnect 711.

In this embodiment, peripheral 710 SoC1 having an interface coupled to streaming packet source 706, may include a medium access control (MAC) and packet to AXI adapter 712 to classify packets to/from streaming interface 707 and adapt them with stream addresses as in other embodiments. For example, a packet from steaming interface 707 to a destination, e.g., sub-peripheral0 on SoC1 (dashed line 722) or sub-peripheral1 on SoC7 (dotted line 724), the packet is converted to PCIe/AXI data chunks, stream addressed and written to the destination over the PCIe/AXI buses. That is, the Packet to AXI adapter 712 converts the packet to AXI chunks and writes over the AXI/PCIe interconnect, depending on the destination, using the stream addressing technique discussed above. In this manner data packets may be efficiently written to peripherals and/or sub-peripherals regardless of whether connected via PCIe or AXI interconnects, and avoiding unnecessary descriptors allowing the destination device to manage its own memory without the source being aware of how the destination manages its own memory.

Figure 8:
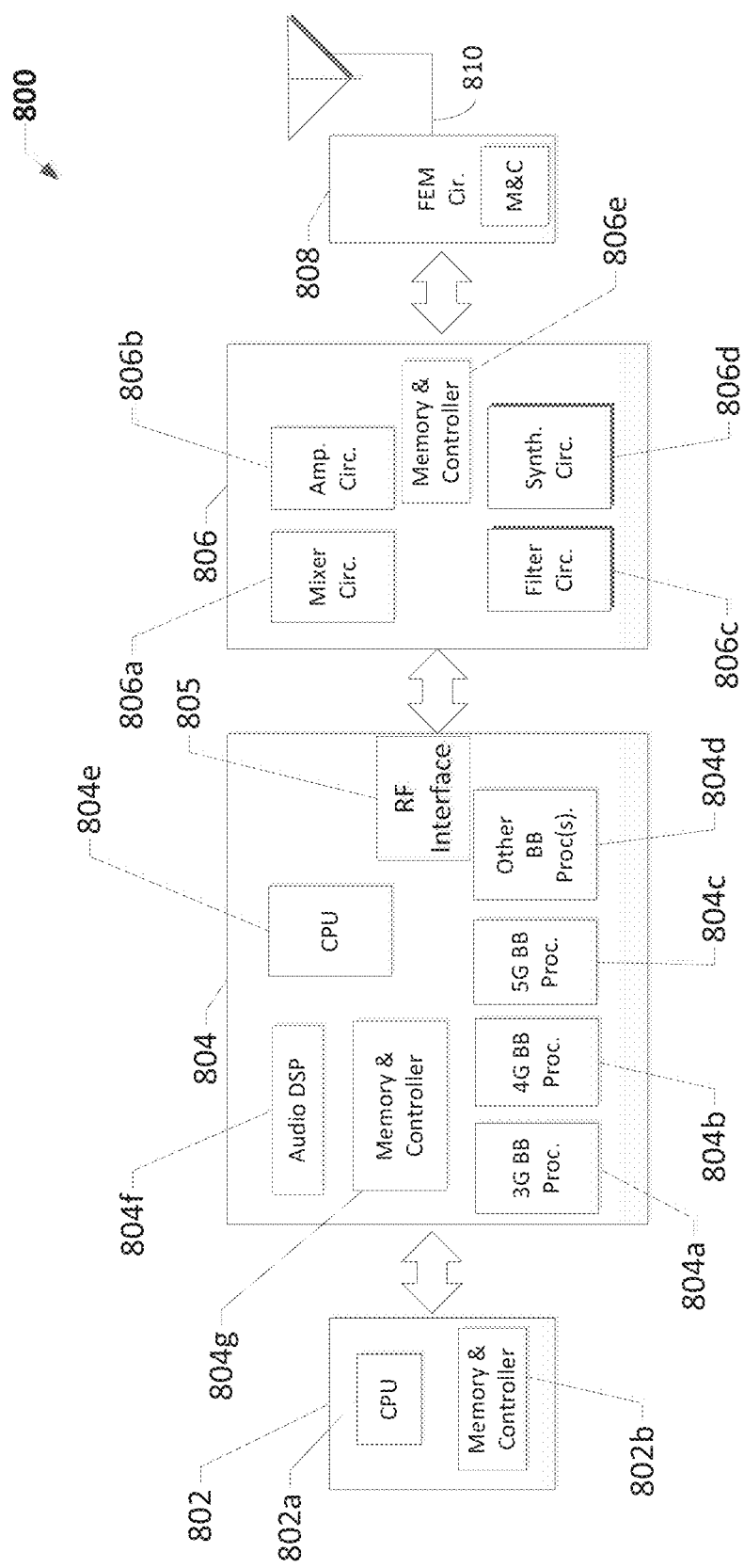
FIG. 8 shows an example communication system including address streaming interconnects according to the inventive embodiments.

Turning to FIG. 8, a communication device 800 which may utilize the stream addressing embodiments to do memory mapped writes and stream data packet between SoCs and/or sub-peripherals will now be described. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 8 illustrates, for one embodiment, example components of an electronic device 800 which may utilize stream addressing of inventive embodiments for data writes between various components. In certain embodiment, the electronic device 800 may be, implement, be incorporated into, or otherwise be a part of a user equipment (UE) or network access station such as an eNB or gNB. In some embodiments, the electronic device 800 may include application circuitry 802, baseband circuitry 804, Radio Frequency (RF) circuitry 806, front-end module (FEM) circuitry 808 and one or more antennas 810, coupled together at least as shown. In embodiments where the electronic device 800 is implemented as a network communication device, PC, laptop, server, the electronic device 800 may also include interface circuitry (not shown) for communicating over a wired interface (for example, PCIe, AXI, an X2 interface, an S1 interface, and the like) using stream addressing interconnect embodiments previously discussed.

The application circuitry 802 may include one or more application processors or processing units. For example, the application circuitry 802 may include circuitry such as, but not limited to, one or more single-core or multi-core processors 802*a*. The processor(s) 802*a* may include any combination of general-purpose processors and dedicated processors (e.g., graphics processors, application processors, etc.). The processors 802*a* may be coupled with and/or may include a memory 802*b* (also referred to as "storage", or "buffer") and may include memory controller functionality to provide stream addressing read/write access for its own processors and/or other peripherals/sub-peripherals to enable various applications and/or operating systems and/or to run on the system and/or enable features of the inventive embodiments to be enabled.

The baseband circuitry 804 may include circuitry such as, but not limited to, one or more single-core or multi-core processors to arrange, configure, process, generate, transmit, receive, or otherwise communicate data using stream addressing as described in various embodiments herein. Baseband circuitry 804 may generally be implemented as an SoC and can be a source or destination of memory writes as a host, peripheral and include sub-peripherals and associated buffers/memories with AXI interconnects as in the prior described embodiments. The baseband circuitry 804 may include one or more baseband processors and/or control logic to process baseband signals received from a receive signal path of the RF circuitry 806 and to generate baseband signals for a transmit signal path of the RF circuitry 806. Baseband circuitry 804 may interface with the application circuitry 802 for generation and processing of the baseband signals and for controlling operations of the RF circuitry 806. For example, in some embodiments, the baseband circuitry 804 may include a third generation (3G) baseband processor 804*a*, a fourth generation (4G) baseband processor 804*b*, a fifth generation (5G) baseband processor 804*c*, and/or other baseband processor(s) 804*d* for other existing generations, generations in development or to be developed in the future (e.g., 6G, etc.). The baseband circuitry 804 (e.g., one or more of baseband processors 804*a-d*) may handle various radio control functions that enable communication with one or more radio networks via the RF circuitry 806. The radio control functions may include, but are not limited to, signal modulation/demodulation, encoding/decoding, radio frequency shifting, and the like. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may include elements for compression/decompression and echo cancellation and may include other suitable processing elements in other embodiments. The baseband circuitry 804 may further include memory module 804g (also referred to as "memory 804g", "storage 804g", or "CRM"). The memory module 804g may be used to load and store data and/or instructions for operations performed by the processors of device 800. Memory and memory controller module 804g for one embodiment may include any combination of suitable volatile memory and/or non-volatile memory. The memory module 804g may include any combination of various levels of memory/storage including, but not limited to, memory having embedded software instructions (e.g., firmware), random access memory (e.g., dynamic random access memory (DRAM)), cache, buffers, etc.) and include memory controller with stream addressing functionality as described in various embodiments herein. The memory module 804g may be shared among the various processors in device 800 or dedicated to particular processors of baseband circuitry 804. Components of the baseband circuitry 804 may be suitably combined in a single chip, a single chipset, or disposed on a same circuit board as a system on a chip (SoC) in some embodiments. In some embodiments, some or all of the constituent components of the baseband circuitry 804 and the application circuitry 802 may be implemented together, such as, for example, on a single system on a chip (SOC).

In some embodiments, the baseband circuitry 804 may provide for communication compatible with one or more radio technologies. For example, in some embodiments, the baseband circuitry 804 may support communication with an E-UTRAN, NR and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc., to facilitate the communication with the wireless network. RF circuitry 806 may include a receive signal path that may include circuitry to down-convert RF signals received from the FEM circuitry 808 and provide baseband signals to the baseband circuitry 804. RF circuitry 806 may also include a transmit signal path that may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c and memory and memory controller 806e. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature downconversion and/or upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and/or direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC)

and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect, as other types of frequency synthesizers may be suitable. For example, synthesizer circuitry 806d may be a delta-sigma synthesizer, a frequency multiplier, or a synthesizer comprising a phase-locked loop with a frequency divider. The synthesizer circuitry 806d may be configured to synthesize an output frequency for use by the mixer circuitry 806a of the RF circuitry 806 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 depending on the desired output frequency. In some embodiments, a divider control input (e.g., N) may be determined from a look-up table based on a channel indicated by the application circuitry 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path that may include circuitry configured to operate on RF signals received from one or more antennas 810, amplify the received signals and provide the amplified versions of the received signals to the RF circuitry 806 for further processing. FEM circuitry 808 may also include a transmit signal path that may include circuitry configured to amplify signals for transmission provided by the RF circuitry 806 for transmission by one or more of the one or more antennas 810. In some embodiments, the FEM circuitry 808 may include a TX/RX switch to switch between transmit mode and receive mode operation. The FEM circuitry 808 may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the electronic device 800 may include additional elements such as, for example, a display, a camera, one or more sensors, and/or interface circuitry (for example, input/output (I/O) interfaces or buses) (not shown). In embodiments where the electronic device is implemented in or by a network access station such as eNB, the electronic device 800 may include network interface circuitry. The network interface circuitry may be one or more computer hardware components that connect electronic device 800 to one or more network elements, such as one or more servers within a core network or one or more other eNBs via a wired connection. To this end, the network interface circuitry may include one or more dedicated processors and/or field programmable gate arrays (FPGAs) to communicate using one or more communications protocols/interfaces such as PCIe, AXI, X2 application protocol (AP), S1 AP, Stream Control Transmission Protocol (SCTP), Ethernet, Point-to-Point (PPP), Fiber Distributed Data Interface (FDDI), and/or any other suitable interface or communications protocols to which the inventive embodiments may be applied.

Figure 9:
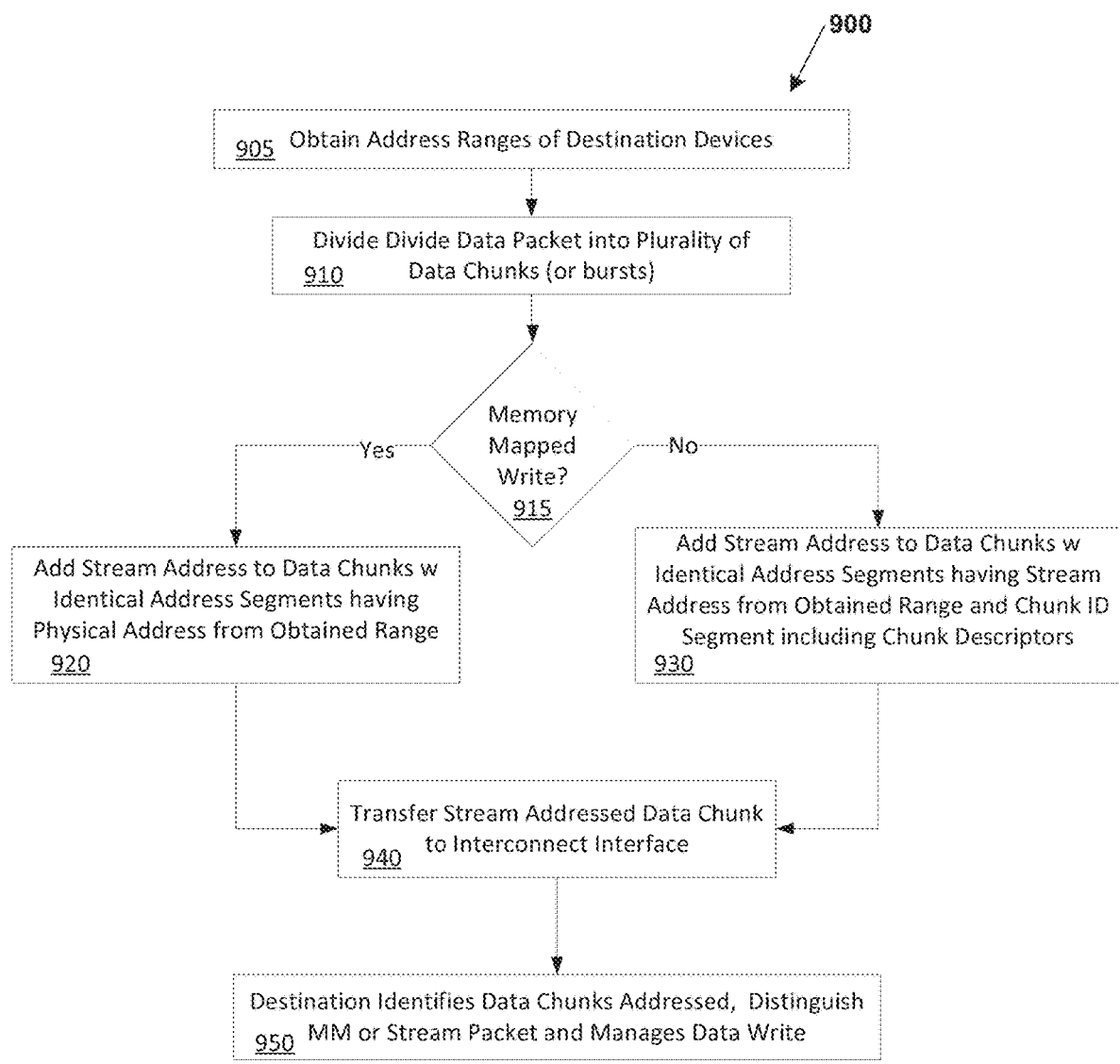
FIG. 9 shows an example method of stream addressing according to embodiments of the invention.

Referring to FIG. 9, a method 900 is disclosed for stream addressing a data packet to be written between a source device and a destination device memory. In certain embodiments, the source and address devices may be a host, peripheral or sub-peripheral as described previously, and the source and destination may be connected by at least two types of interconnects, a first interconnect capable of streaming the data packet, such as a PCIe interconnect, and a second interconnect, not capable of streaming the data packet, such as an AXI interconnect (excluding AXI-4 type,).

Generally, method 900 may include the source, such as a host SoC of earlier embodiments, obtaining 905 an address range corresponding to the destination device, for example a sub-peripheral resident on a separate SoC from the host. The address range may include a physical address range for handling memory mapped writes, and a stream address range for handling streaming of data packets, also as described earlier. The source may obtain 905 the address range for the destination device and any other possible destination devices to which it may write data, by recalling from a memory, the various destination address ranges. This may entail a simple look up table of predetermined address ranges which are, pre-programmed during manufacture, discovered during device initialization, exchanged when a peripheral is added, or some other dynamic or static address discovery method.

When a data packet, or any memory mapped write, such as configuration, code download, etc., is ready to be written to the destination memory, the data packet is divided 910 into a plurality of data chunks having sizes compatible with the interconnect(s) connecting the destination, for example AXI. If 915 the data from the source is a memory mapped write, an address is added 920 to each of the plurality of data chunks where the address includes an address segment having a physical address of the destination memory obtained in step 905.

If 915, the data write is a packet streaming write, an address is added 930 to each of the data chunks having an address segment which includes a stream address of the destination memory obtained in step 905, and a chunk identifier segment is added which at least provides a SoP value and EoP value for the destination to know the bounds of the data packet being streamed as discussed in earlier embodiments.

The stream addressed data chunks are then transferred 940 to the interconnect interface where it is routed to and received 950 by the destination by virtue of the address present in the stream address associated with each data chunks. The data chunks are stored by the destination at physical address location managed by the destination and unknown to the source.

Example Embodiments

In a First Example embodiment, an apparatus for use in an electronic device includes: writable memory circuit to store write data from a separate source device; an interface with a first data interconnect; and a memory controller in communication with the writable memory circuit and adapted to manage physical addresses of the writable memory circuit to store the write data received from the source device, via the first data interconnect, in said writeable memory circuit, the write data having a stream address distinguishing the write data between a memory mapped write and a streamed data packet write, and wherein said memory controller causes said write data to be stored in said writable memory circuit at a physical memory address unknown to the source device, and without memory pointers or descriptors exchanged between the apparatus and the source device.

A Second Example embodiment further defines the First Example, wherein the first data interconnect comprises a system on a chip (SoC) interconnect.

A Third Example embodiment adds to the First example, wherein said source device provides the write data over a second data interconnect in communication with the first data interconnect, the second data interconnect comprising a peripheral component interconnect express (PCIe) interconnect.

In a Fourth Example embodiment, the Second Example is further defined by the first data interconnect comprising one of an advanced eXtensible interconnect (AXI) or an open core protocol (OCP) interconnect and wherein said source device provides said write data via a second data interconnect in communication with the first data interconnect, the second data interconnect comprising a PCIe interconnect.

According to a Fifth Example embodiment, the First Example is furthered by the memory controller being further adapted to send, or cause to be sent, a backpressure register signal to the source device when said writeable memory circuit is full, or nearly full, and wherein said backpressure register signal indicates to said source device to stop sending the write data, at least temporarily.

In a Sixth Example embodiment, the First Example is furthered by the source device being a data packet streaming device and wherein said write data to be written in said writable memory circuit comprises an Ethernet data packet.

A Seventh Example embodiment defines a memory circuit to stream a data packet to a destination device, the memory circuit including: a buffer memory storing the data packet to be written to a memory of the destination device comprising one of a host, a peripheral or a sub-peripheral, over one or more data interconnects between the memory circuit and the destination device, at least one of said data interconnects being incapable of streaming packets having a size of the data packet to be written to the memory of the destination device; and a memory controller in communication with said buffer memory and configured to divide the data packet into a plurality of data chunks and add a stream address to each of the plurality of data chunks, wherein the stream address include an address portion that is identical for each one of the divided plurality of data chunks of said data packet, and a chunk identifier portion that is different for each of said plurality of data chunks of the data packet, including at least a start of packet (SoP) value and an end of packet (EoP) value, said chunk identifier portion indicating an order of the plurality of data chunks to reconstitute the data packet.

An Eighth Example embodiment further defines the Seventh Example, wherein the address portion of the stream address does not identify a physical address where the destination device should store the plurality of data chunks or the data packet in its memory, and wherein the destination device stores the data packet without the memory circuit having any knowledge of the physical memory address(es) used by the destination device.

According to a Ninth Example embodiment, the Seventh Example is furthered by the one or more data interconnects comprise an advanced eXtensible interconnect (AXI).

In a Tenth Example embodiment, the Ninth Example is furthered by the one or more data interconnects further comprise a peripheral component interconnect express (PCIe) in communication with the AXI.

An Eleventh Example embodiment further defines the Seventh by including a backpressure register in communication with the memory controller, the backpressure register having an indicator to indicate the memory the destination device is full.

According to a Twelfth Example, the Seventh Example is further defined by at least one of the destination device or the memory circuit are implemented as a system on a chip (SoC).

A Thirteenth Example further defines the Seventh Example including a backpressure register in communication with the memory controller, the backpressure register having an indicator to indicate the memory the destination device is full.

According to a Fourteenth Example, the Seventh Example embodiment is furthered by the memory circuit and the destination device are both systems on a chip (SoCs) co-located in a same communication device.

In a Fifteenth Example embodiment, a method is disclosed for stream addressing a data packet between a source and a destination connected by at least two types of interconnects, a first interconnect capable of streaming the data packet and a second interconnect not capable of streaming the data packet, the method comprising: dividing the data packet into a plurality of data chunks; adding a stream address to each of the plurality of data chunks, each stream address comprising a repeated first portion indicating the destination and a non-repeated portion indicating at least a start of packet (SoP) field and an end of packet (EoP) field; and transmitting the plurality of stream addressed data chunks.

According to a Sixteenth Example embodiment further defines the Fifteenth wherein the source is unaware of a physical memory address used by the destination to store the data chunks.

A Seventeenth Example embodiment defines the Fifteenth by including the step of ceasing transmitting, at least temporarily, if a backpressure indicator has been set by the destination.

An Eighteenth Example furthers the Fifteenth Example wherein the first interconnect comprises a peripheral component interconnect express (PCIe) and wherein the second interconnect comprises one of an advanced eXtensible interconnect (AXI) or an open core protocol (OCP) interconnect, In a Nineteenth Example, the Fifteenth Example is furthered by the source and the destination comprises one of a host device, a peripheral system on a chip (SoC) or a sub-peripheral residing on the SoC.

A Twentieth Example further defines the Fifteenth Example, wherein prior to dividing the data packet, the method further comprises: receiving the data packet via a streaming packet interface.

A Twenty-First Example embodiment defines an apparatus for use in an electronic device includes: means for storing write data from a separate source device; an interface with a first data interconnect; and means for controlling memory management of physical addresses of the write data received from the source device, via the first data interconnect, in said means for storing write data, the write data having a stream address distinguishing the write data between a memory mapped write and a streamed data packet write, and wherein said means for controlling memory management causes said write data to be stored in said means for storing write data at a physical memory address unknown to the source device, and without memory pointers or descriptors exchanged between the apparatus and the source device.

A Twenty-Second Example embodiment may combine the Twenty-First Example with any of the Second through Twentieth Examples embodiments.

In a Twenty-Third Example embodiment, a memory apparatus is disclosed for stream addressing a data packet between a source and a destination connected by at least two types of interconnects, a first interconnect capable of streaming the data packet and a second interconnect not capable of streaming the data packet, the memory apparatus comprising: means for dividing the data packet into a plurality of data chunks; means for adding a stream address to each of the plurality of data chunks, each stream address comprising a repeated first portion indicating the destination and a second non-repeated portion indicating at least a start of packet (SoP) field and an end of packet (EoP) field; and means for transmitting the plurality of stream addressed data chunks.

In a Twenty-Fourth Example embodiment, any of the First through Twenty-Third Example embodiments may be combined in any manner.

Disclaimer: The present disclosure has been described with reference to the attached drawing figures, with certain example terms and wherein like reference numerals are used to refer to like elements throughout. The illustrated structures, devices and methods are not intended to be drawn to scale, or as any specific circuit or any in any way other than as functional block diagrams to illustrate certain features, advantages and enabling disclosure of the inventive embodiments and their illustration and description is not intended to be limiting in any manner in respect to the appended claims that follow, with the exception of 35 USC 112, sixth paragraph claims using the literal words "means for," if present in a claim.

As utilized herein, the terms "component," "system," "interface," "logic," "circuit," "device," and the like are intended only to refer to a basic functional entity such as hardware, software (e.g., in execution), logic (circuits or programmable, firmware alone or in combination to suit the claimed functionalities. For example, a component, module, device or processing unit may mean a microprocessor, a controller, a programmable logic array and/or a circuit coupled thereto or other logic processing device, and a method or process may mean instructions running on a processor, firmware programmed in a controller, an object, an executable, a program, a storage device including instructions to be executed, a computer, a tablet PC and/or a mobile phone with a processing device.

By way of illustration, a process, logic, method or module can be any analog circuit, digital processing circuit or combination thereof. One or more circuits or modules can reside within a process, and a module can be localized as a physical circuit, a programmable array, a processor. Furthermore, elements, circuits, components, modules and processes/methods may be hardware or software, combined with a processor, executable from various computer readable storage media having executable instructions and/or data stored thereon. Those of ordinary skill in the art will recognize various ways to implement the logical descriptions of the appended claims and their interpretation should not be limited to any example or enabling description, depiction or layout described above, in the abstract or in the drawing figures.

The invention claimed is:

1. An apparatus for use in an electronic device, the apparatus comprising:
a writable memory circuit to store write data from a separate source device;
an interface with a first data interconnect; and
a memory controller in communication with the writable memory circuit and adapted to manage physical addresses of the writable memory circuit to store the write data received from the source device, via the first data interconnect, into said writeable memory circuit, the write data having a stream address distinguishing the write data between a memory mapped write and a streamed data packet write, and wherein said memory controller causes said write data to be stored in said writable memory circuit at a physical memory address unknown to the source device, and without memory pointers or descriptors exchanged between the apparatus and the source device.

2. The apparatus of claim 1, wherein the first data interconnect comprises a system on a chip (SoC) interconnect.

3. The apparatus of claim 1, wherein said source device provides the write data over a second data interconnect in communication with the first data interconnect, the second data interconnect comprising a peripheral component interconnect express (PCIe) interconnect.

4. The apparatus of claim 2, wherein the first data interconnect comprises one of an advanced eXtensible interconnect (AXI) or an open core protocol (OCP) interconnect and wherein said source device provides said write data via a second data interconnect in communication with the first data interconnect, the second data interconnect comprising a PCIe interconnect.

5. The apparatus of claim 1, wherein the memory controller is further adapted to send, or cause to be sent, a backpressure register signal to the source device when said writeable memory circuit is full, or nearly full, and wherein said backpressure register signal indicates to said source device to stop sending the write data, at least temporarily.

6. The apparatus of claim 1, wherein the source device is a data packet streaming device and wherein said write data to be written in said writable memory circuit comprises an Ethernet data packet.

7. A memory circuit to stream a data packet to a destination device, the memory circuit comprising:
- a buffer memory storing the data packet to be written to a memory of the destination device comprising one of a host, a peripheral or a sub-peripheral, over one or more data interconnects between the memory circuit and the destination device, at least one of said data interconnects being incapable of streaming packets having a size of the data packet to be written to the memory of the destination device; and
- a memory controller in communication with said buffer memory and configured to divide the data packet, into a plurality of data chunks and add a stream address to each of the plurality of data chunks, wherein said stream address comprises:
  - an address segment that is identical for each one of the divided plurality of data chunks of said data packet, and
  - a chunk identifier segment that is different for each of said plurality of data chunks of the data packet, including at least a start of packet (SoP) value and an end of packet (EoP) value, said chunk identifier portion indicating an order of the plurality of data chunks to reconstitute the data packet.

8. The memory circuit of claim 7, wherein the address segment of the stream address does not identify a physical address where the destination device should store the plurality of data chunks or the data packet in its memory, and wherein the destination device stores the data packet without the memory circuit having any knowledge of the physical memory address(es) used by the destination device.

9. The memory circuit of claim 7, wherein the one or more data interconnects comprise an advanced eXtensible interconnect (AXI).

10. The memory circuit of claim 9, wherein the one or more data interconnects further comprise a peripheral component interconnect express (PCIe) in communication with the AXI.

11. The memory circuit of claim 7, further comprising a backpressure register in communication with the memory controller, the backpressure register having an indicator to indicate the memory the destination device is full.

12. The memory circuit of claim 7, wherein at least one of the destination device or the memory circuit are implemented as a system on a chip (SoC).

13. The memory circuit of claim 7, wherein the memory circuit and the destination device are both systems on a chip (SoCs) co-located in a same communication device.

14. The memory circuit of claim 13, wherein the communication device comprises a user equipment (UE) or a network access station.

15. A method for stream addressing a data packet between a source and a destination connected by at least two types of interconnects, a first interconnect capable of streaming the data packet and a second interconnect not capable of streaming the data packet, the method comprising:
- dividing the data packet into a plurality of data chunks;
- adding a stream address to each of the plurality of data chunks, each stream address comprising a repeated first portion indicating the destination and a non-repeated portion indicating at least a start of packet (SoP) field and an end of packet (EoP) field; and
- transmitting the plurality of stream addressed data chunks to an interface with the first or second interconnect.

16. The method of claim 15, wherein the source is unaware of a physical memory address used by the destination to store the data chunks.

17. The method of claim 15 further comprising:
- ceasing transmitting, at least temporarily, if a backpressure indicator has been set by the destination.

18. The method of claim 15, wherein the first interconnect comprises a peripheral component interconnect express (PCIe) and wherein the second interconnect comprises one of an advanced eXtensible interconnect (AXI) or an open core protocol (OCP) interconnect.

19. The method of claim 15, wherein the source and the destination comprises one of a host device, a peripheral system on a chip (SoC) or a sub-peripheral residing on the SoC.

20. The method of claim 15, wherein prior to dividing the data packet, the method further comprises:
- receiving the data packet via a streaming packet interface.

* * * * *